Dec. 5, 1939.  E. M. WALKER  2,182,713
ICE CREAM CONFECTION APPARATUS
Original Filed April 11, 1938   3 Sheets—Sheet 1
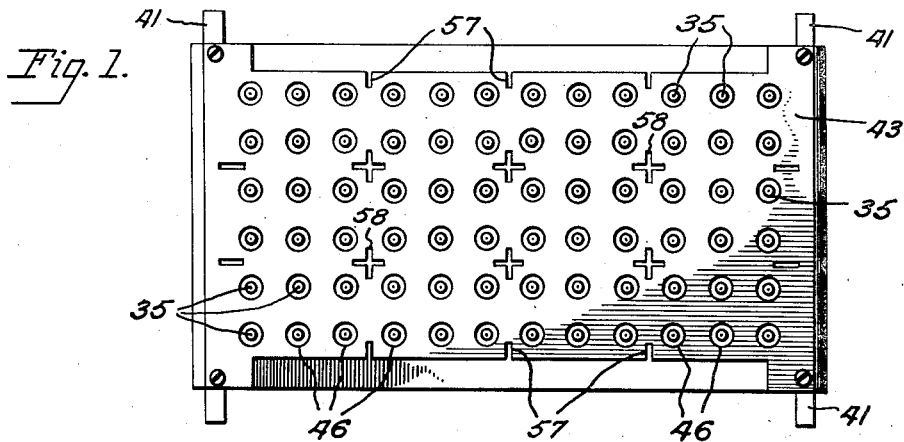
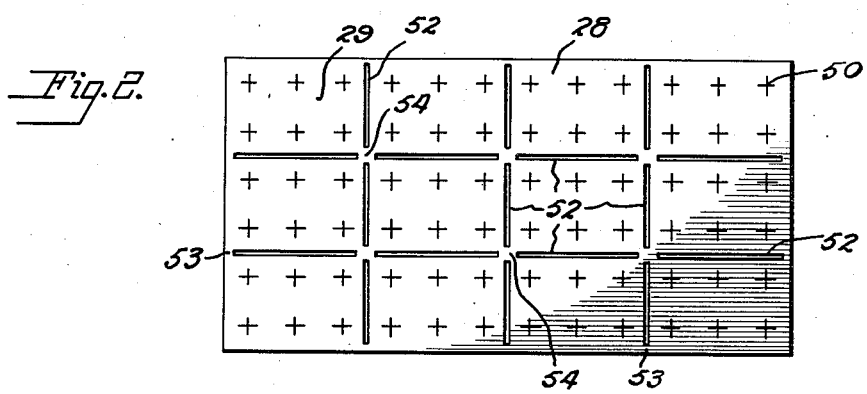
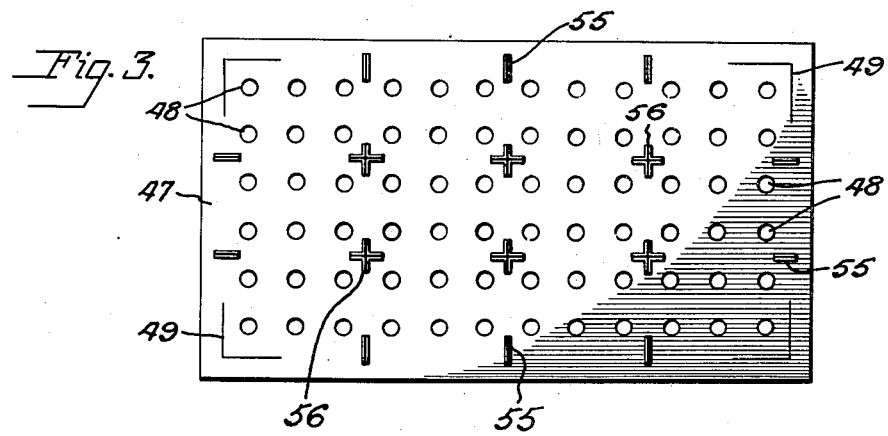
Inventor
E. M. Walker
By Mason Fenwick & Lawrence
Attorneys Dec. 5, 1939.   E. M. WALKER   2,182,713
ICE CREAM CONFECTION APPARATUS
Original Filed April 11, 1938   3 Sheets—Sheet 2
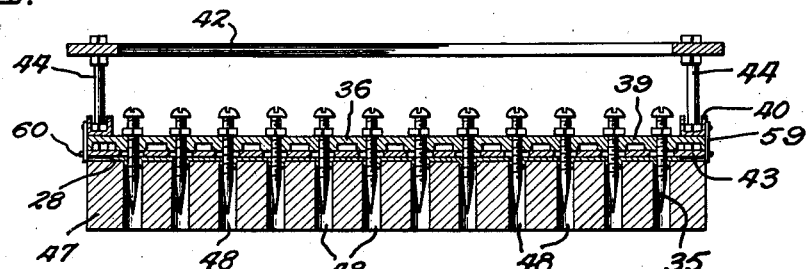
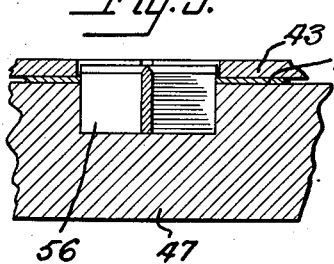
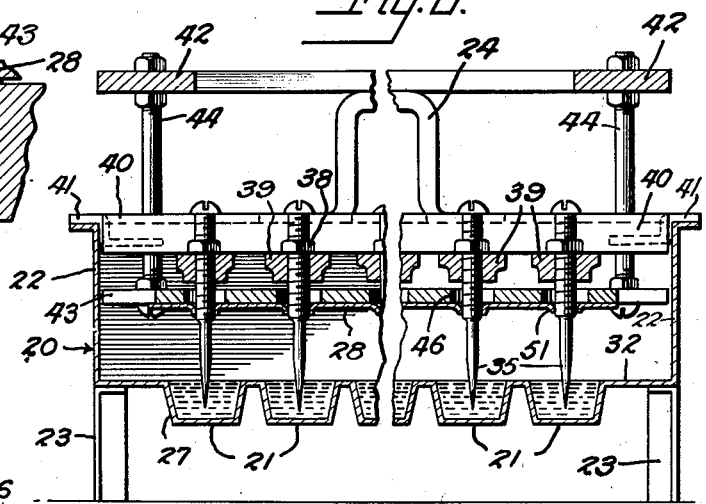
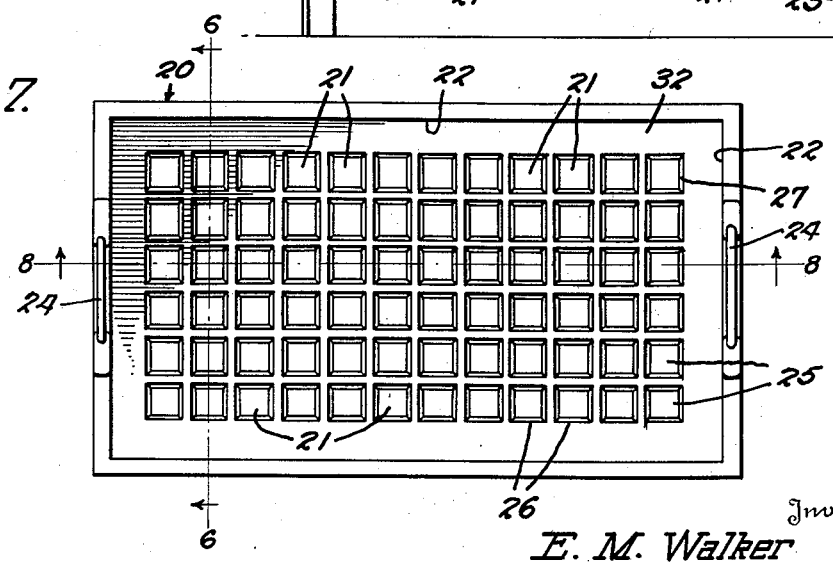
Inventor
E. M. Walker
By Mason Fenwick & Lawrence
Attorneys

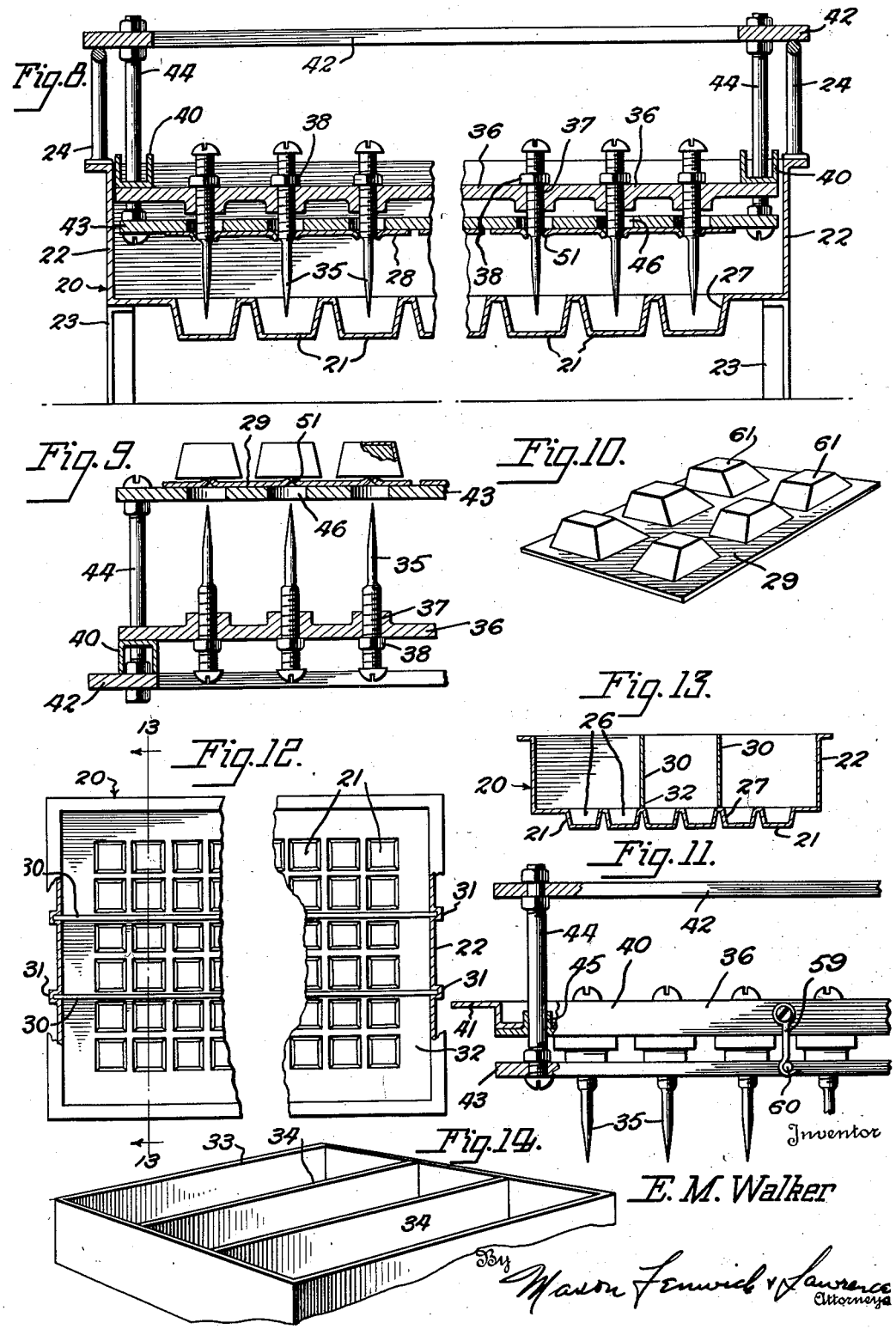

Patented Dec. 5, 1939

2,182,713

UNITED STATES PATENT OFFICE 2,182,713

ICE CREAM CONFECTION APPARATUS

Ernest Moore Walker, Atlanta, Ga.

Original application April 11, 1938, Serial No. 201,421. Divided and this application May 16, 1939, Serial No. 274,021

8 Claims. (Cl. 62—114)

This invention relates to apparatus for making and packaging a frozen confection.

One of the objects of the invention is to provide apparatus for lifting a plurality of frozen confection pieces from a freezing tray and ejecting them from the lifting means so that they will be deposited in precise positions upon a card or other package member which has been previously interposed between the frozen pieces and the ejecting means.

The concept of freezing confection pieces to a lifting means as well as applying the lifting means to pre-frozen units is within the scope of the invention. Also the invention contemplates the idea of employing in the apparatus coated or uncoated frozen confection pieces, which rest freely in precise positions upon a package member, or which are confined in suitable recesses in a package member, or which are retained by suitable prongs or projections formed on said package member. Further where the frozen pieces are coated with a coating of material adhesive in its nature until chilled solid, said pieces may be either freely received in precise positions upon said package member after the coating has solidified or they may be fixed in their precise positions upon the package member either solely through the adhesive properties of the coating, or by means of the adhesive coating auxiliary to the confining or retaining means hereinbefore mentioned.

Another object of the invention is to provide apparatus for handling frozen confections, from the freezing to the packaging of the same by impaling a blank of sheet material constituting one or a plurality of cards or package members upon a plurality of lifting pins, applying said pins to the confection pieces which are to be lifted, and ejecting the confection pieces from the pins by retraction of the pins through the blank of sheet material, whereby the confections are deposited in precise positions against the blank.

The phase of the invention embraced within the foregoing object contemplates means for severing the blank into individual package members simultaneously with the perforation of the blank by the impaling pins, and it also has in view the use of previously perforated blanks through the perforations of which the pins project.

Still another object of the invention is to provide apparatus which comprises a pin rack or carrier provided with a plurality of lifting pins, and a die block which cooperates with said pin rack for impaling upon said pins a sheet blank placed between said pin rack and die. Furthermore in the event that the sheet blank comprises a plurality of partially separated package members the invention contemplates the provision of suitably located knives between the pin rack and die block for severing the sheet blank into its individual package member components at the same time that the sheet blank is impaled upon the pins.

This apparatus includes also a freezing tray with suitable mold depressions in which the confection pieces are frozen, and a frame carrying an ejector plate adapted to be juxtaposed with respect to said mold depressions. A pin rack reciprocating in the frame so that the pins protrude through perforations in the ejector plate, to a point below the level of the tops of the mold depressions with the frame being adapted to be inverted with the frozen pieces in adherence to said pins whereby said pin rack falls by gravity within said frame. This retracts the pins from said frozen pieces through the perforations in said ejector plate, leaving the frozen pieces deposited in pin-determined positions upon the sheet blank or the components into which it has been divided.

A further object of the invention is to provide means in which a package unit comprising a sheet package member upon which have been deposited in precise positions a plurality of confection pieces which may be free or fixed with respect to said package member.

Other objects of the invention will appear from the following description of a preferred and practical embodiment of the invention taken in connection with the accompanying drawings.

In the drawings wherein like characters of reference indicate corresponding parts in the various figures:

Figure 1 is a plan view of the lower face of the ejector plate showing the free ends of the lifting pins;

Figure 2 is a plan view of a sheet or package blank incorporating a plurality of partially detached and perforated sheet package members;

Figure 3 is a plan view of the die block;

Figure 4 is a vertical longitudinal section showing the die action between the pin rack and the die block, with the interposed sheet blank;

Figure 5 is a fragmentary view in section showing a portion of the die block with the cross-shaped knife for severing the undetached corners between adjacent package members;

Figure 6 is a transverse vertical broken section through the apparatus illustrating the positions of the several elements when the pins are located in a mix positioned within mold depressions of the freezing tray;

Figure 7 is a plan view of the freezing tray;

Figure 8 is a section taken along the line 8—8 of Figure 7;

Figure 9 is a partial vertical section of a portion of the apparatus in inverted position showing the pins retracted and the frozen confection pieces resting in pin-determined positions upon a package member;

Figure 10 is a perspective view of a package unit;

Figure 11 is a view partly in vertical section and partly in elevation illustrating means for latching the pin rack to the frame, useful when the pins are thrust into hard-frozen confection pieces;

Figure 12 is a plan view partly in section illustrating the employment of partitions in a freezing tray allowing the use at one time of several kinds of freezing mix;

Figure 13 is a section taken along the line 13—13 of Figure 12;

Figure 14 is a perspective view showing an alternative form of removable partitions.

Referring now in detail to the several figures, and more particularly to Figures 6 and 8, there is shown one form of freezing tray 20 having mold depressions 21 in its bottom. The freezing tray has sides 22 permitting it to retain a surplus of the freezing mix when the mold depressions are being filled. The sides 22 also function as a guide for the apparatus which is to be lowered into the tray as will presently be described.

The tray as shown is provided with legs 23 adapting the tray to be set down in a brine tank with the mold depressions 21 immersed in the body of brine. The brine bath is cooled by a refrigeration system connected thereto but not shown in the drawings. In other words, the mold depressions are positioned in heat exchange relation with an appropriate refrigerant or refrigerating means. The freezing tray 20 is provided with upstanding handles or supports 24 at the ends, which facilitate the handling of the tray and at the same time afford a rest or limit stop for the apparatus which is lowered into the tray.

The mold depressions may be of any suitable number, size or shape. In the present embodiment of the invention they are arranged in parallel rows 25 and 26 and the depressions are slightly flared 27 so that the frozen pieces determined by the size and shape of the mold depressions shall come out easily when thawed by a conventional method of dipping the tray in warm water or by any other thawing expedient or as a result of the expansion during freezing.

It is contemplated that the frozen pieces either in coated or uncoated form shall eventually be deposited or received in the same arrangement and spacing of the mold depressions, upon a sheet blank 28 such as that illustrated in Figure 2 which may be packaged intact or preferably divided into a plurality of smaller sheets or package member 29 (see Figure 10). In the illustrated embodiment of the invention each of these smaller package members is designed to receive six of the frozen pieces.

Inasmuch as it may be desired to freeze several kinds of confection at the same time, as to flavor, color, etc., removable partitions 30 are provided for dividing the chamber of the freezing tray 20 into a plurality of compartments. Figure 12 shows how the opposite ends of the freezing tray may be formed with vertical grooves 31 into which the ends of the partitions 30 may be slipped, the grooves 31 being so located that the partitions come down upon the bottom 32 of the tray between rows 26 of freezing depressions.

Another way of supporting the partitions 30 is by means of a frame 33 to the opposite walls of which the partitions 34 are attached, the frame being substantially of the same size as the chamber of the freezing tray and being removably insertable therein.

In charging the freezing tray a quantity of a freezing mix slightly in excess of the amount which will fill the mold depressions is poured into the tray and scraped back and forth with a suitable instrument until the mold depressions are filled. The surplus mix is removed. Where several kinds of mix are to be frozen suitable quantities of each mix are poured into the tray into the respective spaces segregated by the partitions 30 and manipulated in the manner above described to fill the mold depressions.

The frozen confection pieces or any desired number of them are lifted from the freezing tray at one time by means of pins 35 carried by a pin rack 36. The pins may have their free ends immersed in the mix while it is soft (see Figure 6) so that the confection pieces will be frozen to said pins, or the pins may be forced into the confection pieces after the latter have been frozen, the pieces adhering to the pins through friction. To facilitate forcing the pins through the hard-frozen confection pieces the pins may be warmed to a temperature above freezing point. Then when they enter the frozen pieces they become frozen into said pieces by heat interchange which reduces the temperature of the pins to a point below freezing.

The pins are adjustable, being threaded into the pin rack 36 as shown at 37 in Figure 8. A lock nut 38 holds them fixed in any position of adjustment. For the purpose of the present invention other means for adjusting the pins may be used. Sometimes it may be desired to lift only every alternate piece from the freezing tray in which case, the pins which it is not desired to employ, may be retracted so that they will not dip into the mold depression to which they are related.

The pin rack as is indicated in Figure 6 comprises a plurality of bars 39 extending lengthwise of the freezing tray and being secured to end bars 40 which have lugs 41 extending over and resting upon the sides of the freezing tray when the pin rack is in place.

The pin rack 36 reciprocates within a frame constituted by an upper rectangular structure 42 and a lower plate 43 which because of its main function will be hereinafter styled the ejector plate. The rectangular structure 42 and the ejector plate 43 are held in fixed spaced relation by the perpendicular rods 44. Said rods pass freely through apertures 45 in the pin rack 36, the pin rack reciprocating within said frame between the rectangular structure 42 and the ejector plate, being guided by said rods. When the frame is in the position shown in Figure 8, for example, the pin rack falls downward so that the pins protrude through aligned apertures 46 in the ejector plate. When the frame is inverted as in Figure 9, the pin rack 36 falls back, retracting the pins 35 entirely within the frame and within the ejector plate.

An important feature of the invention is the means for impaling the sheet blank 28 upon the pins carried by the pin rack. For the purpose of accomplishing this a die block 47 is provided, see Figures 3 and 4. This die block has a plurality of wells 48 having the same arrangement and spacing as the pins 35 and into which the pins descend when the frame carrying the pin rack 36 is placed in proper juxtaposition to the die block.

Before the frame is placed on the die, a sheet blank is laid upon the die block. Corner lines 49 or other indicia are provided on the die block to insure accurate placing of the sheet blank. Figure 2 shows the sheet blank 28 formed with cross-shaped perforations 50 intersecting at the points where the pins will penetrate. However, it is not essential that the sheet blank be previously perforated.

The sheet blank 28 having been laid upon the die block 47, the frame is lowered upon the blank, the pins penetrating the sheet blank 28 in the manner indicated in Figure 4 and the blank is pushed by the die block toward the base of the pins. Where the sheet blank is perforated by the pins or where it is provided with the cross-shaped slits 50, the material of the sheet blank will be upset as indicated at 51 in Figures 4, 6, 8 and 9 which may be of assistance in fixing the frozen pieces upon the sheet blank. In some instances the sheet blank may have been previously perforated with holes as large as or larger than the pins in which case the die block will not be necessary for impaling the sheet blank upon the pins nor will any upset prongs or projections be formed.

If the sheet blank is to be separated into a plurality of package members 29, it will be provided with suitable slits 52 partially severing the smaller package members 29 from the large sheet blank 28. Certain marginal webs 53 and their intersecting webs 54 will be left so that the sheet blank can be made and handled as a whole up to the time of being inducted into the apparatus. The die block is preferably provided with the upstanding marginal knives 55 and the cross-shaped intersection knives 56 which cooperate with corresponding slots 57 and 58 respectively in the ejector plate so that when the die action takes place between the frame with its pin rack, and the die block, the sheet blank intervening, the marginal and intersecting webs will be severed and the package members 29 completely separated from one another. They will however be maintained in their relative positions due to the fact that they are positioned upon the pins.

After the sheet blank has been impaled or positioned upon the pins in the manner described, the entire frame including the pin rack with the sheet blank in place, is lifted from the die block and lowered into the freezing tray until the lugs 41 of the pin rack rest upon the sides of the freezing tray. The frame may be lowered a little further until the rectangular member 42 rests upon the handles 24. With the pin rack resting upon the sides of the freezing tray, the pins will, such of them as are to be used for lifting purposes, project below the plane of the tops of the mold depressions 21. If the mix in said depressions is soft, the mere weight of the pin rack with the pins is enough to cause the pins to descend into the mix to the extent determined by the engagement of the lugs 41 with the sides 20 of the freezing tray and the adjustment of the pins themselves relative to the pin rack.

If the mix is frozen hard it may be necessary to force the pins into the confection pieces, in which case the pin rack must be coupled to the frame.

Figure 11 shows an example of such coupling means which is an ordinary hook 59 pivotally mounted on the pin rack and engaging a projection 60 on a portion of the frame, in this instance the ejector plate. The hook will be subjected to tensile strain when pressure is put upon the frame to push the pins down into the frozen mix. When it is unnecessary to have the pin rack coupled to the frame, the hook may be flipped back and disengaged with the projection.

In operation, the frame together with the pin rack and pins having been placed as shown in Figure 6, with respect to the freezing tray, the frozen confection pieces being fixed to the ends of the pins, and the mold depressions of the freezing tray having been warmed sufficiently to release the frozen confection pieces, the frame is then lifted from the tray and inverted to the position shown in Figure 9. The weight of the pin rack causes it to fall bringing the frozen confection pieces into contact with the package member 29, the impact of which engagement pulls the pins from the confection pieces leaving the latter seated in precise pin-determined positions upon the package member.

In the making of a chocolate coated or other coated frozen confection, the pins bearing the frozen confection pieces are lifted from the freezing tray and dipped into the coating material preferably sufficiently to completely submerge the frozen confection pieces so that the coating covers the faces impaled by the pins as well as the other faces. The faces impaled by the pins will become the bases of the finished confections. The frame together with the pin rack, pins and coated confections are inverted preferably while the coating is still in soft and adhesive condition. When the coated frozen confection pieces are deposited upon the package member the coating will adhere to said package member fixing the confection pieces in position. The prongs or projections 57 bore into the coating material and assist in anchoring the frozen confection pieces in place.

The finished packaged article is illustrated in Figure 10 comprising the sheet or package member 29 upon which are stuck the six coated frozen confection pieces 61. Preferably, these are made of bite size.

A modified form of sheet member may be used in which the sheet material is embossed to form recesses having bounding ridges. The bottoms of the recesses are of such size and shape as to accommodate the individual frozen confection pieces. This sheet member is introduced to the apparatus in the same manner as the blank illustrated in Figure 2 and perforated in substantially the centers of the bottoms of the recesses. The frozen confections, whether coated or uncoated are deposited within these recesses upon the retraction of the pins in the manner illustrated in Figure 9 and it is not necessary that the frozen confection pieces should be in adherence to the package member for the ridges will hold them in place. It is contemplated that the package unit containing or carrying a plurality of the frozen confection pieces shall be slipped into a suitable envelope or carton. By use of partitions two varieties of the frozen confection can be vended on a single card or package member.

A further modification of the sheet blank and consequently of the package member is one in which the package member is stamped with suitable knock-outs which may have a broad portion for receiving the frozen confection pieces and a narrower handle portion to be grasped by the person eating the confection. The knockouts are previously perforated in the centers of the broad portions or they are subject to perforation by the pins in the manner already described. It is contemplated that the consumer will purchase the carton and tear out each knockout when the confection pieces are to be eaten.

This invention is a division of my copending application Serial Number 201,421, filed April 11, 1938.

While the above description describes what is believed to be a preferred embodiment of the invention, it will be understood by those skilled in the art that the specific details of construction as illustrated and described are by way of example only and are not to be construed as limiting the scope of the invention defined in the appended claims.

What I claim is:

1. Frozen confection apparatus comprising a frame including spaced members one of which is an ejector plate having a plurality of perforations, a pin rack reciprocable between said frame members, a plurality of pins carried by said rack freely projectable through said perforations during one direction of reciprocation of said rack and retractable from said perforations in the opposite direction of reciprocation, a freezing tray having mold depressions in heat exchange relation with a refrigerant for freezing a plurality of individual confection pieces, means supporting said frame with the pin rack in a position in which the pins dip into said depressions whereby the frozen confection pieces will be adherent to said pins, said apparatus including a renewable sheet member between said frozen confection pieces and said ejector plate having perforations through which said pins project, whereby upon inversion of said frame said rack falls, retracting said pins and leaving said confection pieces seated in pin-determined positions upon said sheet member.

2. Frozen confection apparatus comprising a frame including spaced members one of which is an ejector plate having a plurality of perforations, a pin rack reciprocable between said frame members, a plurality of individually adjustable pins carried by said rack freely projectable through said perforations in one direction of reciprocation of said rack and retractable from said perforations in the opposite direction of reciprocation, a freezing tray having mold depressions in heat exchange relation with a refrigerant for freezing a plurality of individual confection pieces, means supporting said frame with the pin rack in a position in which the pins dip into said depressions whereby the frozen confection pieces will be adherent to said pins, said apparatus including a renewable sheet member between said frozen confection pieces and said ejector plate having perforations through which said pins project, whereby upon inversion of said frame said rack falls, retracting said pins, leaving said confection pieces seated in pin-determined positions upon said sheet member.

3. Frozen confection apparatus comprising a frame including spaced members one of which is an ejector plate having a plurality of perforations, a pin rack reciprocable between said frame members, a plurality of pins carried by said rack freely projectable through said perforations in one direction of reciprocation of said rack, and retractable from said perforations in the other direction of its reciprocation, a freezing tray having mold depressions in heat exchange relation with a refrigerant for freezing a plurality of individual confection pieces, into which said pins when in projected position are adapted to be dipped whereby frozen confection pieces will be adherently attached to said pins, said apparatus including a renewable sheet member between said frozen confection pieces and said ejector plate having perforations through which said pins project whereby upon inversion of said frame said rack is retracted, withdrawing said pins leaving said confection pieces seated in pin-determined position upon said sheet member.

4. Frozen confection apparatus comprising a frame including spaced members one of which is an ejector plate having a plurality of perforations, a pin rack reciprocable between said frame members, a plurality of pins carried by said rack freely projectable through said perforations in one direction of reciprocation of said rack and retractable from said perforations in the opposite direction of its reciprocation, a freezing tray having mold depressions in heat exchange relation with a refrigerant for freezing a plurality of individual confection pieces, means for locking said rack relative to said frame with said pins in projected position whereby said pins may be forced into said frozen confection pieces by pressure upon said frame to cause said confection pieces to adhere to said pins, said apparatus including a renewable sheet member between said frozen confection pieces and said ejector plate having perforations through which said pins project whereby upon inversion of said frame and release of said locking means said rack may be retracted, withdrawing said pins, leaving said confection pieces seated in pin-determined relation upon said sheet member.

5. Frozen confection apparatus comprising a frame including spaced members one of which is an ejector plate having a plurality of perforations, rods connecting said spaced members, a pin rack reciprocable between said frame members and guided by said rods, a plurality of pins carried by said rack freely projectable through said perforations in one direction of reciprocation of said rack and retractable from said perforations in the other direction of its reciprocation, a freezing tray having mold depressions subjected to a refrigerated brine bath for freezing a plurality of individual confection pieces, into which said pins when in projected position are adapted to be dipped whereby frozen confection pieces will be adherently attached to said pins, said apparatus including a renewable sheet member between said frozen confection pieces and said ejector plate having perforations through which said pins project whereby upon inversion of said frame said rack is retracted, withdrawing said pins leaving said confection pieces seated in pin-determined position upon said sheet member.

6. Frozen confection apparatus comprising a frame including spaced members one of which is an ejector plate having a plurality of perforations, a pin rack reciprocable between said frame members, a plurality of pins carried by said rack freely projectable through said perforations in one direction of reciprocation of said rack and retractable from said perforations in the opposite direction of its reciprocation, a die block having depressions corresponding in number and position to said pins, said apparatus including a renewable sheet member adapted to be interposed between said pins and said die block and to be impaled upon said pins by die action between said pin rack and said die block, a freezing tray having mold depressions subjected to a refrigerated brine bath for freezing a plurality of individual confection pieces, said frame being adapted to be brought into operative relation with said tray in which the pins dip into said depressions whereby the frozen confection pieces will be adherent to said pins, said frame being invertible whereby upon inversion thereof and retraction of said rack, said pins are withdrawn leaving said confection pieces seated in pin-determined relation upon said sheet member.

7. Frozen confection apparatus comprising a frame including spaced members one of which is an ejector plate having a plurality of perforations, a pin rack reciprocable between said frame members, a plurality of pins carried by said rack freely projectable through said perforations in one direction of reciprocation of said rack and retractable from said perforations in the opposite direction of its reciprocation, a die block having depressions corresponding in number and position to said pins, said apparatus including a renewable sheet member adapted to be interposed between said pins and said die block and to be impaled upon said pins by die action between said pin rack and said die block, said sheet member being partially divided into smaller units, knives between said ejector plate and die block positioned to complete the severance of said sheet member into smaller units, a freezing tray having mold depressions subjected to a refrigerated brine bath for freezing a plurality of individual confection pieces, said frame being adapted to be brought into operative relation with said tray, in which the pins dip into said depressions whereby the frozen confection pieces will be adherent to said pins, said frame being invertible whereby upon inversion thereof and retraction of said rack, said pins are withdrawn leaving said confection pieces seated in pin-determined relation upon said sheet member.

8. Frozen confection apparatus comprising a frame including spaced members one of which is an ejector plate having a plurality of perforations, a pin rack reciprocable between said frame members, a plurality of pins carried by and relatively adjustable with respect to said rack and freely projectable through said perforations during one direction of reciprocation of said rack and retractable from said perforations in the opposite direction of reciprocation, a freezing tray having mold depressions cooled by heat exchange with a refrigerant for freezing a plurality of individual confection pieces, means supporting said frame with the pin rack in a position in which the pins dip into said depressions whereby the frozen confection pieces will be adherent to said pins, said apparatus including a renewable sheet member between said frozen confection pieces and said ejector plate having perforations through which said pins project, whereby upon inversion of said frame said rack falls, retracting said pins and leaving said confection pieces seated in pin-determined positions upon said sheet member.

ERNEST MOORE WALKER.